United States Patent
Yakovlev (10) Patent No.: US 10,061,599 B1
(45) Date of Patent: Aug. 28, 2018

(54) BUS ENUMERATION ACCELERATION

(71) Applicant: American Megatrends, Inc., Norcross, GA (US)

(72) Inventor: Sergiy B. Yakovlev, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 367 days.

(21) Appl. No.: 14/516,305

(22) Filed: Oct. 16, 2014

(51) Int. Cl.
| G06F 15/177 | (2006.01) |
| G06F 9/445 | (2018.01) |
| G06F 13/42 | (2006.01) |
| G06F 9/4401 | (2018.01) |
| G06F 9/44 | (2018.01) |

(52) U.S. Cl.
CPC ........ G06F 9/44505 (2013.01); G06F 9/4401 (2013.01); G06F 13/4208 (2013.01)

(58) Field of Classification Search
CPC .............................. G06F 15/177; G06F 9/4411
USPC ................................................ 713/2; 710/8
See application file for complete search history.

(56) References Cited

U.S. PATENT DOCUMENTS

| 6,263,378 B1 * | 7/2001 | Rudoff ................ G06F 9/4411 713/2 |
| 6,567,876 B1 * | 5/2003 | Stufflebeam ........ G06F 13/4045 710/300 |
| 6,732,264 B1 * | 5/2004 | Sun ...................... G06F 9/4401 713/2 |
| 6,792,556 B1 * | 9/2004 | Dennis ................. G06F 9/4401 714/36 |
| RE40,092 E * | 2/2008 | Kang ........................ G06F 1/24 713/1 |
| 8,914,653 B2 * | 12/2014 | Yi .......................... G06F 9/4418 713/310 |
| 2002/0133695 A1 * | 9/2002 | Khatri .................. G06F 9/4411 713/1 |
| 2007/0088943 A1 * | 4/2007 | Phelps .................. G06F 9/4401 713/2 |
| 2009/0109786 A1 * | 4/2009 | Ye ....................... G06F 12/0246 365/228 |

(Continued)

OTHER PUBLICATIONS

Web Article: "Systems and Methods for Accessing a Bootable Partition on a Serial Peripheral Interface Device" published by Wikipedia [online][retrieved on Oct. 16, 2014] retrieved from: http://en.wikipedia.org/wiki/PCI_configuration_space , 6 pps.

(Continued)

*Primary Examiner* — Christopher Shin
(74) *Attorney, Agent, or Firm* — Newport IP, LLC | Shigeta & Hope (57) ABSTRACT

Firmware determines during a boot of a computer, if a bus enumeration is needed or if the computer can be booted quicker by skipping a bus enumeration. The firmware performs a bus enumeration if this a first boot or if the bus has had it infrastructure changed since the previous boot. For buses that have only fixed resources coupled to it, then the bus configuration cannot change. Also, for buses that do not have only fixed resources, the infrastructure may be probed to determine if the bus configuration has changed. If there is no change, bus enumeration is not needed. Metadata is created, updated and stored in flash memory involving the bus infrastructure. Since the metadata is stored, a bus enumeration is not needed to gather information about the bus when no change has occurred.

15 Claims, 4 Drawing Sheets

(56) References Cited

U.S. PATENT DOCUMENTS

| | | | | |
|---|---|---|---|---|
| 2010/0241781 A1* | 9/2010 | Wetzel | ................. | G06F 13/385 |
| | | | | 710/313 |
| 2011/0145815 A1* | 6/2011 | Zou | ...................... | G06F 9/4413 |
| | | | | 718/1 |
| 2012/0239918 A1* | 9/2012 | Huang | ................. | G06F 9/4401 |
| | | | | 713/2 |
| 2013/0086372 A1* | 4/2013 | Kojo | ......................... | G06F 1/24 |
| | | | | 713/2 |
| 2014/0201514 A1* | 7/2014 | Chao | .................... | G06F 9/4403 |
| | | | | 713/2 |
| 2014/0223159 A1* | 8/2014 | Lin | ...................... | G06F 9/4401 |
| | | | | 713/2 |
| 2014/0325196 A1* | 10/2014 | Munger | ............... | G06F 9/4401 |
| | | | | 713/2 |
| 2015/0033005 A1* | 1/2015 | Surapuram | .......... | G06F 9/4401 |
| | | | | 713/2 |

OTHER PUBLICATIONS

Web Article: "Enumerating a System with a Single Root Complex" published by Safari [online][retrieved on Oct. 16, 2014] retrieved from: http://my.safaribooksonline.com/book/hardware/0321156307/pci-express-enumeration/ch21lev1sec5 , 6 pps.

* cited by examiner

BUS ENUMERATION ACCELERATION

BACKGROUND

Computer firmware may be used to enumerate buses and devices on buses at startup. Bus enumeration attempts to read possible devices from the buses. In some cases, if no response is received from a device when attempting to read from a slot on a bus, the firmware continues on trying to read a device from a next slot on the bus. If a response is received when attempting to read a device from the slot on the bus, the firmware continues reading functions of the device from the slot on the bus. The firmware may continue its enumeration until possible device slots on the buses have been read for a device. The process of bus enumeration may occur during each startup of the computer system.

It is with respect to these considerations and others that the disclosure made herein is presented.

SUMMARY

Concepts and technologies are described herein for bus enumeration acceleration. In order to enable this functionality, metadata may be collected at the design time, or at some other time, of the computing system. The metadata may contain information about devices on the enumerated buses. The metadata may be delivered to firmware. For closed systems where the system devices may not change, typical bus enumeration may be skipped by the computing system.

According to one aspect presented herein, a computer-implemented method is provided for bus enumeration acceleration. In some implementations, the method starts a boot of a computing system and determines that the computing system is not a closed system. The method may also probe the computing system to detect no configuration change. Additionally, the method may access metadata used to program devices on the bus. The method may program the devices using the metadata without performing bus enumeration.

According to another aspect, a computer-readable storage medium has computer-executable instructions which, when executed by a processor, cause the processor to determine during a boot of the computer that a first device on a bus in a computer is a fixed device. Also, the method may complete the boot of the computer without enumerating the first device on the bus.

According to yet another aspect, a computer for bus enumeration acceleration is provided. The computer includes a processor and a bus and a memory coupled to the processor. The bus may have one or more devices coupled on the bus. The memory may store a Basic Input/Output System ("BIOS") which executes in the processor from the memory. The computer may determine that at least one device coupled to the bus is not a fixed device. The computer may also determine that at least one device on the bus has changed since a previous boot. The computer may update metadata for the devices coupled to the bus.

Additionally, the computer may store the updated metadata and program the devices associated with the bus using the updated metadata. The computer may complete a boot of the computer. During a subsequent boot of the computer, the computer may also determine that the devices on the bus have not changed since the boot of the computer. The computer may also complete the subsequent boot of the computer without enumerating the devices on the bus.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the subject matter, nor is it intended that this Summary be used to limit the scope of the subject matter. Furthermore, the subject matter is not limited to implementations that solve any or all disadvantages noted in any part of this disclosure.

DETAILED DESCRIPTION

The following detailed description is directed to technologies for bus enumeration acceleration. In order to enable this bus enumeration acceleration functionality, metadata may be collected at a design time of a computing system. The metadata contains information about devices on the buses. For example, the metadata may store information relating to interrupts the devices on the buses may utilize. The metadata may also describe the parent/child hierarchy of the devices. The metadata may also contain other information.

The metadata may be delivered to and stored in firmware. The firmware may contain program code that may be stored in a non-volatile memory of the computing system. The firmware may be used when booting a computing system and loading an operating system. The firmware may also be used to enumerate one or more buses prior to completing a boot. Using mechanisms described herein, typical bus enumeration may be skipped for closed systems where the system devices will not change. In systems where the devices change, the metadata may be updated and these updates may be stored. Alternatively, the metadata may collected during an initial bus enumeration instead of being collected at the design time of the computing system.

The firmware may determine, during a boot of the computing system, whether devices on the bus in the computing system are fixed devices. When each device of the system is a fixed device, the computing system may boot without enumerating the bus. When each device attached to the bus is not a fixed device, then a determination may be made as to whether at least one device has changed since a previous boot.

If a device has changed since the previous boot, the metadata that is associated with the device may be updated and stored. The computing system may also program the bus resources associated with the bus using the metadata. In a subsequent boot of the computing system, the computing system may also determine whether at least one device on the bus has changed since the previous boot of the computer. If no device has changed since the previous boot, the computing system may complete the subsequent boot of the computer without a bus enumeration.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks, transform data, or implement particular abstract data types. Moreover, those skilled in the art will appreciate that the subject matter described herein may be practiced with other computer system configurations, including hand-held devices, multi-processor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of bus enumeration acceleration will be described.

Figure 1:
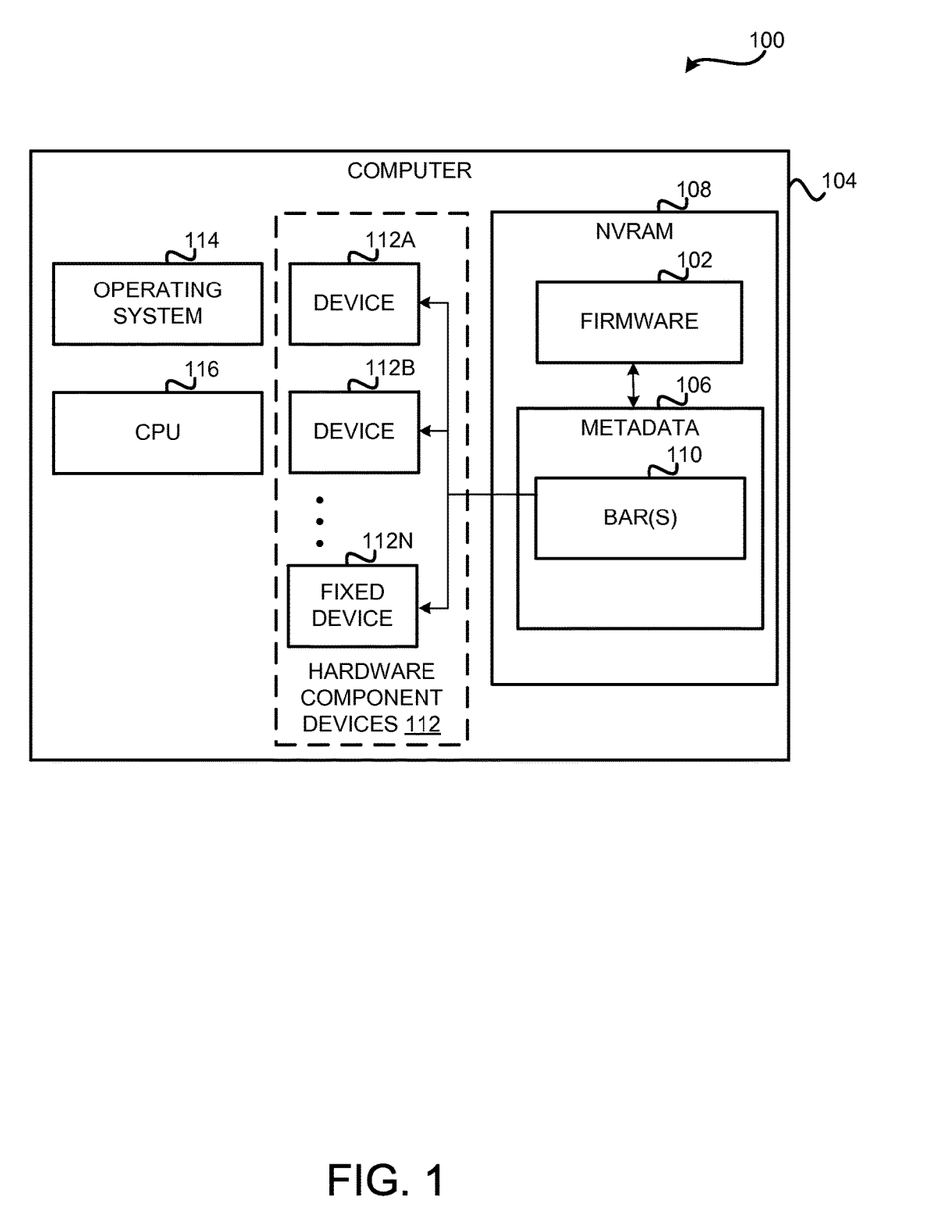
FIG. 1 a block diagram providing an overview of aspects of the embodiments presented herein for accelerating bus enumeration.

Turning now to FIG. 1, a bus enumeration system 100 illustrates a computing system in which bus enumeration acceleration may be performed, in accordance with embodiments disclosed herein. According to various embodiments, a computer 104 may contain a central processing unit ("CPU") 116. The CPU 116 is a central processor that performs arithmetic and logical operations necessary for the operation of the computer. The computer may include a multitude of CPUs 116 and each CPU 116 might include multiple processing cores.

According to various embodiments, a computer 104 may contain firmware 102 that initializes and tests hardware component devices 112. The firmware 102 enumerates the buses to determine which resources or devices 112 are installed on the computer 104. Additionally, bus enumeration may provide details about the resources or devices 112 installed on the computer 104, as described further below.

Figure 2:
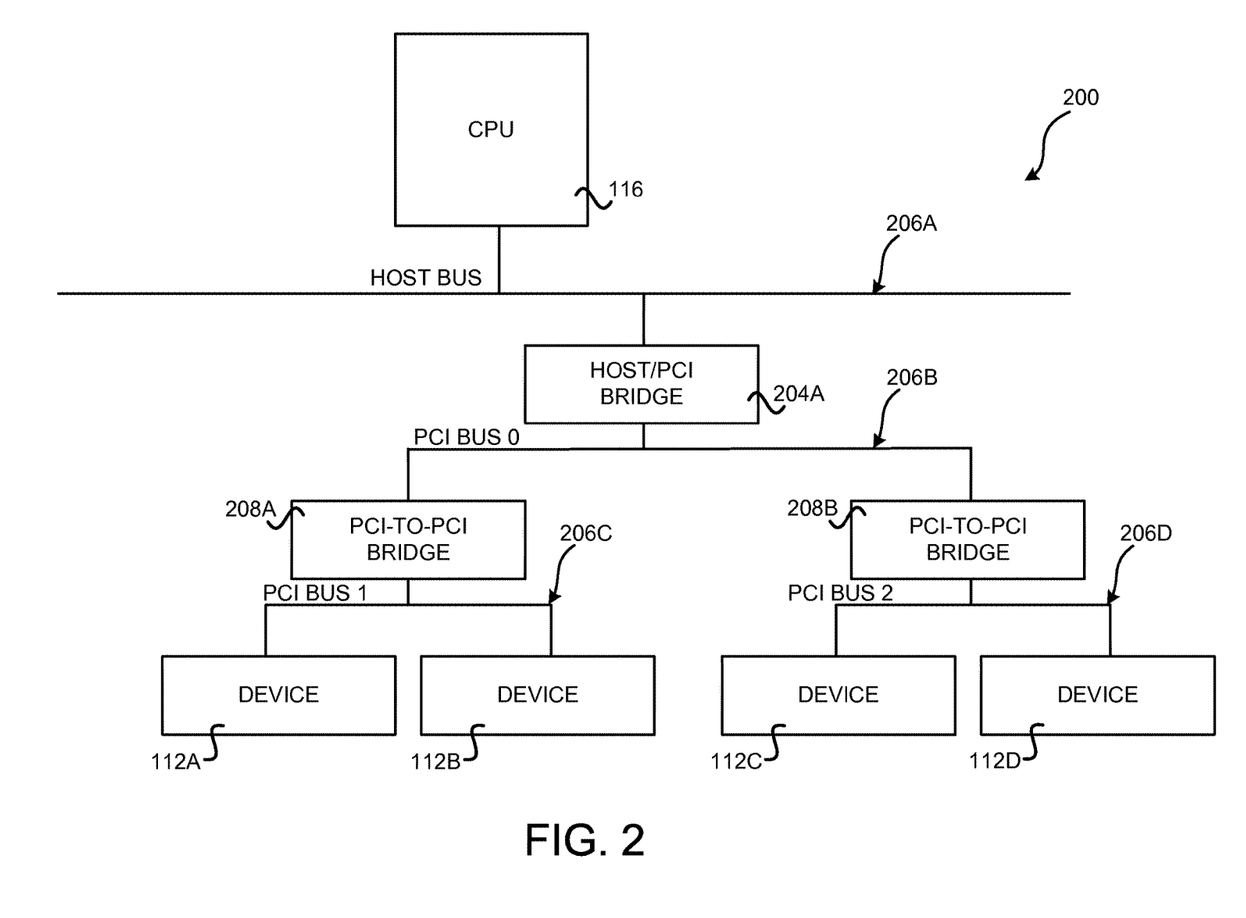
FIG. 2 is a bus diagram showing aspects of the configuration of a computer system bus that forms an operating environment for embodiments presented herein.

The devices 112 may comprise a video card, a sound card, a network card, or a suitably configured card for providing another type of functionality. The devices 112 may also comprise other electronics as well, such as a storage device. FIG. 1 illustrates devices 112A, 112B and 112N (which may be referred to collectively and/or generically as "devices 112"). A number of the devices 112 may be initialized across a number of buses on the computer 104. FIG. 2 illustrates a number of the devices 112 connected to different buses.

In some configurations, the firmware 102 may initialize the devices 112 by programming Base Address Registers ("BARs") 110. The programmed BARs 110 may inform the devices 112 of its address mappings during initializations. The firmware 102, or some other component, may perform these tasks during a boot of the computer 104, when the computer 104 is initialized, when an operating system 114 may be loaded, and possibly at other times. The firmware 102 may be stored in non-volatile random access memory ("NVRAM") 108. Alternately, the firmware 102 may be stored in another type of memory (e.g., flash memory) or may be stored in a read-only memory ("ROM").

The firmware 102 may be used to initialize the devices 112 when the computer 104 is booted. Alternately, the metadata 106 may be used to accelerate the initialization of the devices 112 of the computer 104. The metadata 106 may store properties which describe the devices 112 coupled to the buses of the computer 104. For example, the metadata 106 may store information relating to interrupts the devices 112 utilize along with the category or type of the devices 112. The metadata 106 may also describe the parent/child hierarchy of the devices 112. In some examples, the metadata 106 data may describe additional device properties (e.g., the functions implemented by the device). The metadata 106 may also store contents of the BARs 110.

The metadata 106 may be created when the computer 104 is being designed or provided at some other time. For example, the metadata 106 might be provided at a point after the computer 104 is designed. The computer 104 may be provisioned with the metadata 106 as the computer 104 is being fabricated. Alternately, the metadata 106 may created during an initial boot of the computer 104, or at some other time. The metadata 106 may be stored in a memory, such as a non-volatile random access memory ("NVRAM") 108, in another type of flash memory or may be stored in a read-only memory ("ROM").

Some of the devices 112 may be fixed devices. For example, 112N in FIG. 1 is a fixed device. A fixed device 112N may refer to the devices 112 that are connected directly to a motherboard or not easily removed from the computing device 104. Fixed device 112N is unlikely to change in a subsequent boot of the computer 104. By storing the information for the fixed device 112N in the metadata 106, the normal bus enumeration process may be skipped. Information gathered during bus enumeration may be stored in the metadata 106.

During a boot of the computer 104, the firmware 102 may use the metadata 106 to program the devices 112. In some cases, the enumeration of the buses of the computer 104 may be determined to be unnecessary since the information to program the devices 112 is already located in the metadata 106. Additionally, the firmware 102 may program these devices 112 without having to probe the devices 112 for a change. For example since fixed device 112N is unlikely to change, probing of fixed devices, such as fixed device 112N, for a change may be eliminated during a boot procedure. By not having to probe the devices 112 that are fixed for a change or perform an enumeration of the buses of the computer 104, the boot of the computer 104 may complete more quickly since a time of probing the devices 112 that are fixed is saved. When all the devices 112 of a computer 104 are fixed as determined by the firmware 102, the computer 104 may be considered to be a closed system.

The metadata 106 may also store information for devices 112 that are not fixed. An example of a device 112 that is not fixed is a video card on a PCI bus. Other types of devices 112 and buses are possible and are described below. A video card may be removed or modified. Therefore, the firmware 102 may boot the computer 104 differently using the metadata 106 depending on whether the devices 112 are fixed.

When the metadata 106 already contains the information needed to program the devices 112 that are not fixed, the firmware 102 may probe these devices 112 to determine whether the devices 112 changed since the previous boot of the computer 104. Probing the devices 112 for a change is not a bus enumeration and may take less time to perform than a bus enumeration. Probing typically takes less time than a bus enumeration because the vendor IDs and devices IDs are compared to the previous values in the metadata 106.

When the firmware 102 determines that the probed devices 112 have not changed since the previous boot of the computer 104, then the firmware 102 initializes the devices 112 using the metadata 106 stored in NVRAM 108. The computer 104 may boot quicker by not enumerating the buses.

When the firmware 102 probes the devices 112 and detects a change in the devices 112 from the previous boot of the computer 104, then the firmware 102 may enumerate the buses of the computer 104. The firmware 102 may update the metadata 106 with new information for the devices 112 prior to completing the boot. In subsequent boots of the computer 104, the firmware 102 may use the updated metadata 106 to avoid bus enumeration when the devices 112 have not changed since the last boot. The process is described further by an operating environment 200 which is discussed below.

Turning now to FIG. 2, a bus diagram will be described showing aspects of a computer system that forms an operating environment 200. In particular, the environment 200 shown in FIG. 2 illustrates a simplified view of a computer system having a central processing unit ("CPU") 116. The CPU 116 is a central processor that performs arithmetic and logical operations necessary for the operation of the computer. The computer may include a multitude of CPUs 116 and each CPU 116 might include multiple processing cores.

The CPU 116 is, in turn, connected to one or more buses that together form a hierarchy of buses. The first bus in the hierarchy is the host bus 206A. The next bus in the hierarchy is the bus 206B (PCI bus 0), followed by the bus 206C (PCI bus 1), and the bus 206D (PCI bus 2). The buses 206A-206D may be referred to herein collectively as the buses 206 or individually as a bus 206. Buses at a lower level in the hierarchy may be referred to as subordinate buses to buses at a higher level in the hierarchy. It should be appreciated that the embodiments disclosed herein may be utilized with more or fewer buses 206 than shown in FIG. 2.

As illustrated in FIG. 2, the various buses are interconnected through the use of the bridges 204A, 208A and 208B. The bridge 204A shown in FIG. 2 is a HOST-to-PCI bridge that enables communication between the host bus 206A and the bus 206B. The bridge 208A is a PCI-to-PCI bridge that enables communication between the bus 206B and the bus 206C. The bridge 208B is a PCI-to-PCI bridge that enables communication between the bus 206B and the bus 206D.

As also shown in FIG. 2, the buses 206 may each support one or more devices. For instance, the devices 112A and 112B are connected to the bus 206C while the devices 112C and 112D are connected to the bus 206D. As discussed above, the devices 112 may comprise cards configured for use with a PCI bus, such as a video card, a sound card, a network card, or a suitably configured card for providing another type of functionality. The devices 112 may also comprise other electronics as well, such as a storage device.

The metadata 106 may store information that allows the devices 112A-112D to be initialized without a bus enumeration. In some examples, if there is no change to the configuration, then the devices 112A-112D may be initialized without a bus enumeration. However assuming for example, that device 112D is a video card and since the previous boot device 112D was replaced with a different video card, then a bus enumeration may occur.

During bus enumeration, the devices 112A-112D may be read to determine the location of the devices 112 and properties of the devices 112, as discussed above. Additionally, bus enumeration may also determine the parent/child hierarchy of the buses and the devices 112 coupled to the buses. This information from the bus enumeration is utilized to update the metadata.

In the above example, only device 112D was modified but all the devices 112 were involved in the bus enumeration. Alternatively, if a system contains both fixed resources and resources capable of being updated, then a bus enumeration may ignore enumerating any buses that contain solely fixed resources.

It should be appreciated that more or fewer devices 112 may be utilized than illustrated in FIG. 2. It should also be appreciated that the embodiments presented herein may be utilized with other types of bus architectures and implementations besides a PCI bus, including but not limited to an Industry Standard Architecture ("ISA") bus.

It should be appreciated that the block diagrams shown in FIGS. 1 and 2 and described above have been simplified. While the embodiments presented herein have been disclosed in the context of a generic bus and firmware systems, the embodiments presented herein may be utilized with various types of bus architectures and firmware systems. Some examples of possible bus architectures include Industry Standard Architecture ("ISA"), Peripheral Component Interconnect ("PCI"), Peripheral Component Interconnect eXtended ("PCI-X") and Peripheral Component Interconnect Express ("PCIe") among others. Some examples of firmware include Basic Input/Output System ("BIOS"), Unified Extensible Firmware Interface ("UEFI") and Open Firmware among others.

Figure 3:
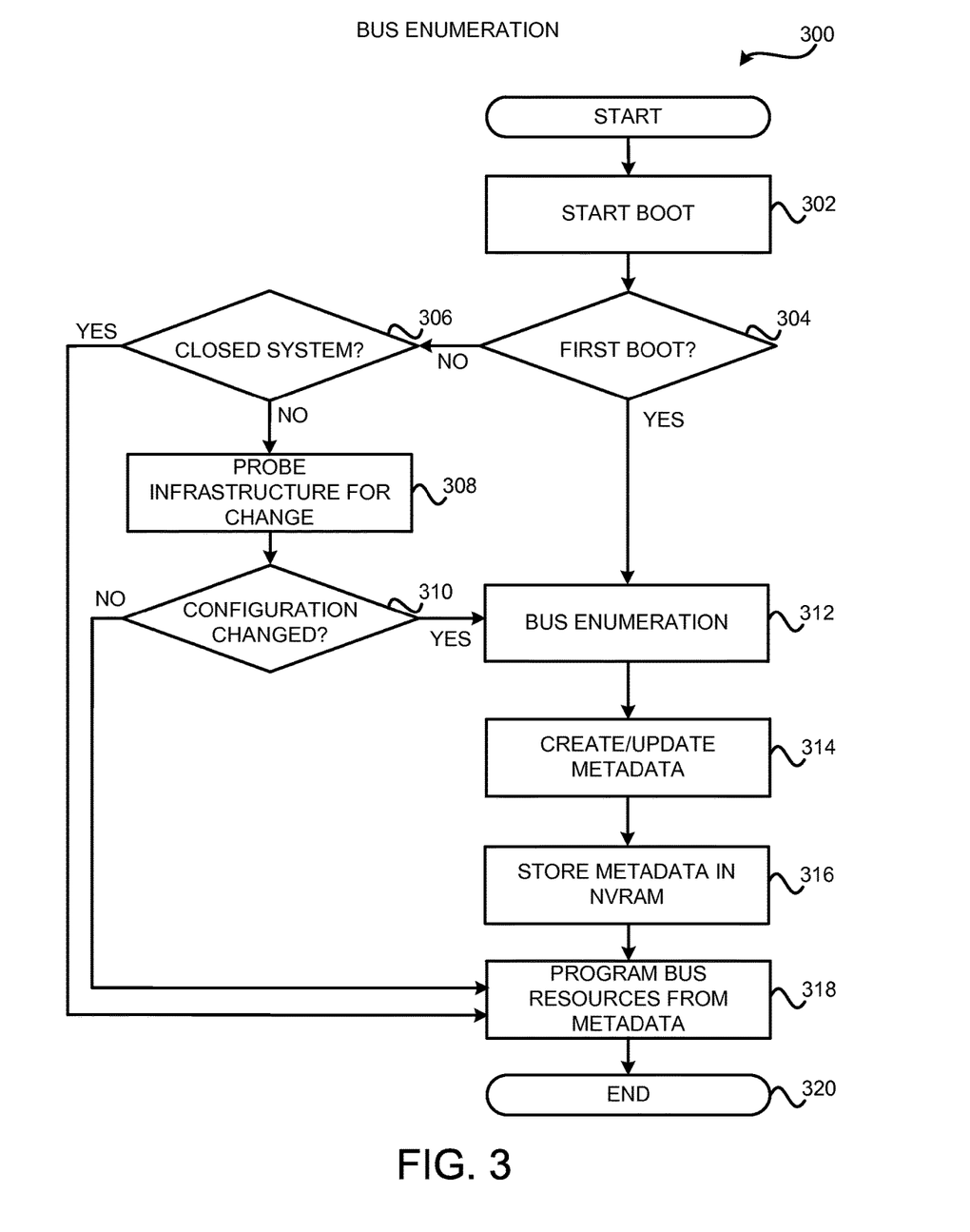
FIG. 3 is a flow diagram showing an illustrative routine for accelerating bus enumeration.

Turning now to FIG. 3, the illustrative routine 300 will be described that illustrates aspects for bus enumeration acceleration. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should be appreciated that more or fewer operations may be performed than shown in the figures and described herein. These operations may also be performed in parallel, or in a different order than those described herein.

The routine 300 may begin at operation 302, where a computer 104 starts a boot. From operation 302, the routine 300 may next proceed to operation 304. At operation 304, a firmware 102 of the computer 104 may determine if the boot started in operation 302 is a first boot of the computer 104. If the boot is the first boot of the computer 104 then the routine 300 may continue to operation 312. If the boot is not the first boot of the computer 104, then the routine 300 may continue to operation 306.

At operation 312, the buses of the computer 104 are enumerated. As discussed above, bus enumeration determines which resources or devices 112 are installed on the computer 104. Additionally, bus enumeration may provide details about the resources or devices 112 installed on the computer 104, as described further below.

From operation 312 the routine 300 may next proceed to operation 314 where the metadata 106 is created by the firmware 102. As discussed above, the metadata 106 describes properties of devices 112 coupled to a bus and the bus is coupled to a processor in the computer 104. In some examples, the device properties described by the metadata 106 include the interrupt(s) the device 112 uses and the device's category or type. The metadata 106 may also describe parent/child hierarchy of the bus and the devices 112 coupled to the bus. The metadata 106 data may also describe additional device properties (e.g., the functions implemented by the device). Although, the bus described in FIG. 3 is described as a single bus, the bus may also be a hierarchy of connected buses. A hierarchy of connected buses is described below further regarding FIG. 2.

The routine 300 may next proceed from operation 314 to operation 316. At operation 316, the metadata 106 created by the firmware 102 in operation 314 is stored in NVRAM 108. Alternatively, the metadata 106 may be stored in another type of flash memory.

The routine 300 may next proceed from operation 316 to operation 318. Resources of the bus are programmed by the firmware 102 using the metadata 106 at operation 318. Base Address Registers ("BARs") 110 may be used to write commands to the bus resources. The BARs 110 are programmed and then the devices 112 can determine its address mapping from the BARs 110. From operation 318 the routine 300 may continue to operation 320 where the routine 300 ends.

As discussed above, in response to the firmware 102 determining at operation 304 the boot started in operation 302 is not a first boot of the computer 104, then the routine 300 may continue to operation 306. At operation 306, the firmware 102 determines if the computer 104 is a closed system. In some examples, bus enumeration is not performed for a computer 104 that is determined to be in a closed system. As discussed above, in a closed system, the computer 104 has fixed resources that are already defined using the metadata 106. The metadata 106 for a closed system will not need to be updated since none of the resources coupled to the bus in the computer will change. By skipping the normal bus enumeration steps, a computer 104 that is a closed system may accelerate the boot process.

If the computer 104 is a closed system then the routine 300 may continue to operation 318 where the firmware 102 programs the bus resources utilizing the metadata 106. From operation 318 the routine 300 may continue to operation 320 where the routine 300 ends.

In response to the firmware 102 determining at operation 306 that the computer 104 is not a closed system then the routine 300 may continue to operation 308. At operation 308, the firmware 102 probes the bus infrastructure for a change. In some examples, a bus infrastructure change is determined by probing the infrastructure to verify the vendor ID and device ID of the devices. This probing of the infrastructure is not a bus enumeration. Probing may take less time than a bus enumeration because the vendor IDs and devices IDs are compared to the previous values in the metadata 106.

The routine 300 may next proceed from operation 308 to operation 310 where the firmware 102 determines if there is configuration change based upon the probe of the infrastructure in operation 310. If there is no configuration change then the routine 300 may continue to operation 318 where bus resources are programmed from the metadata 106. From operation 318 the routine 300 may continue to operation 320 where routine 300 ends. As mentioned above, if there is no configuration change for the bus, then the computer 104 may have an accelerated boot since a bus enumeration is not performed.

In response to the firmware 102 determining at operation 310 that the configuration changed then the routine 300 may continue to operation 312. At operation 312 the firmware 102 enumerates the buses of the computer 104. As described above, bus enumeration determines which resources are installed on the computer 104. From operation 312 the routine 300 may next proceed to operation 314.

At operation 314, the firmware 102 updates the metadata 106 utilizing information from the bus enumeration. Routine 300 then may continue on to operation 316 where the updated metadata 106 is stored in the NVRAM 108, or some other memory. The updated metadata 106 stored in the NVRAM 108 may utilized in a subsequent boot to provide an accelerated boot, assuming the resources are not modified.

From operation 316, the routine 300 may continue on to operation 318 where the firmware 102 programs the bus resources utilizing the metadata 106. From operation 318, the routine 300 may end at operation 320.

As illustrated, bus enumeration may occur in FIG. 3 during a first boot or when the configuration has changed in the computer 104 that is not a closed system. Some of the paths in FIG. 3 are shorter than others, which translates into accelerated boot times for the computer 104. For example, one path for an accelerated boot time is a closed system which is a computer 104 that has only fixed resources coupled to the bus. Another path for a quicker boot time is a computer 104 that does not contain only fixed resources but in which the configuration has not changed since a previous boot.

Figure 4:
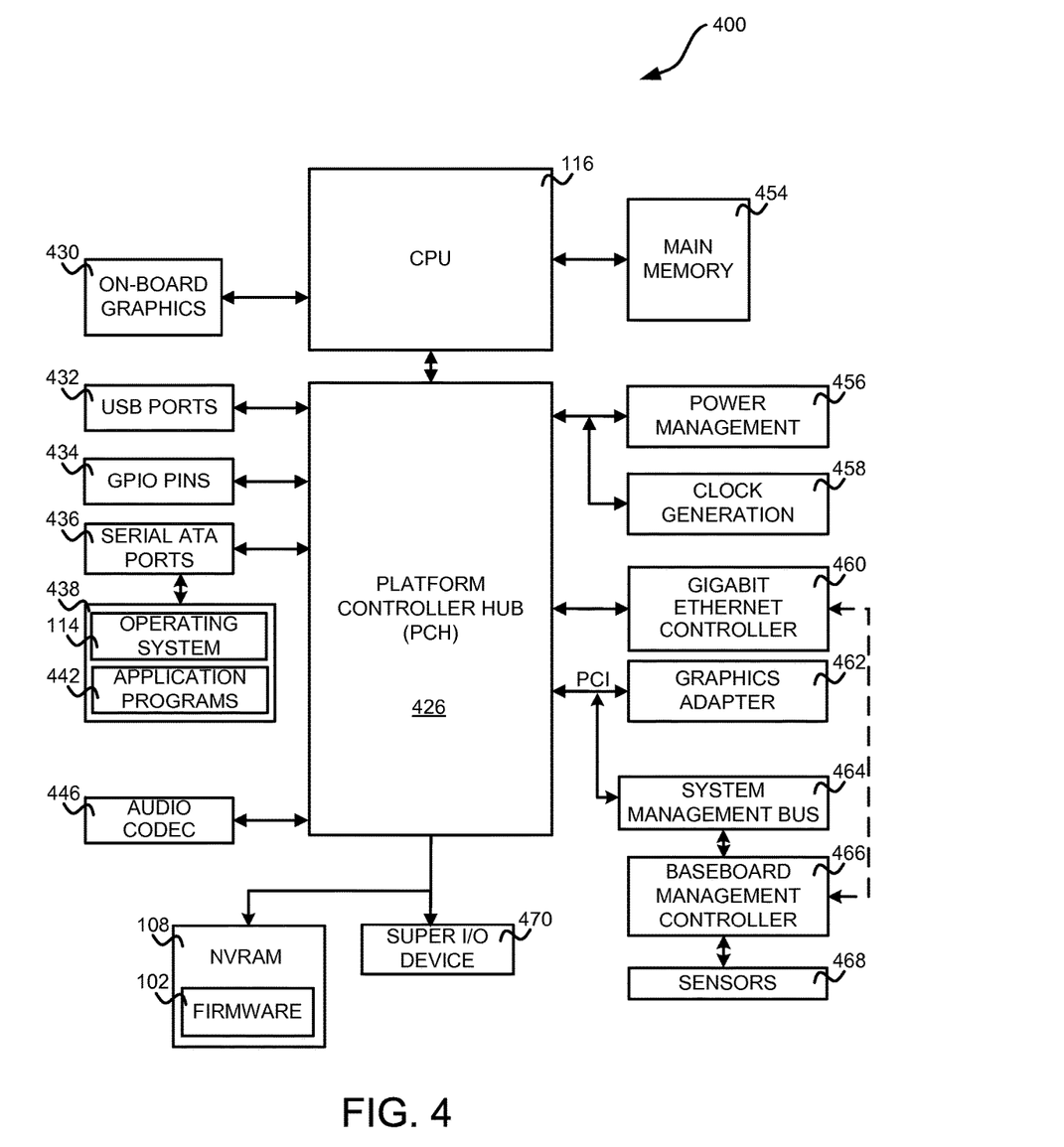
FIG. 4 is a computer architecture diagram showing an illustrative computer architecture that might be utilized to implement a computing system that embodies the various concepts and technologies presented herein.

Referring now to FIG. 4, a computer architecture diagram showing an illustrative computer architecture that might be utilized to implement a computing system that embodies the various concepts and technologies presented herein will be described. FIG. 4 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 4 shows an illustrative computer architecture for a computer 400 that may be utilized in the implementations described herein. The illustrative computer architecture shown in FIG. 4 is for the computer 400 that includes a baseboard, or "motherboard", which is a printed circuit board to which a multitude of components or devices may be connected by way of a system bus or other electrical communication path. In one illustrative embodiment, a CPU 116 operates in conjunction with a Platform Controller Hub ("PCH") 426. The CPU 116 is a central processor that performs arithmetic and logical operations necessary for the operation of the computer 400. The computer 400 may include a multitude of CPUs 116. Each CPU 116 might include multiple processing cores.

The CPU 116 provides an interface to a random access memory ("RAM") used as the main memory 454 in the computer 400 and, possibly, to an on-board graphics adapter 430. The PCH 426 provides an interface between the CPU 116 and the remainder of the computer 400.

The PCH 426 may also be responsible for controlling many of the input/output functions of the computer 400. In particular, the PCH 426 may provide one or more universal serial bus ("USB") ports 432, an audio codec 446, a Gigabit Ethernet Controller 460, and one or more general purpose input/output ("GPIO") pins 434. The USB ports 432 may include USB 2.0 ports, USB 3.0 ports and USB 3.1 ports among other USB ports. The audio codec 446 may include Intel High Definition Audio, Audio Codec '97 ("AC '97") and Dolby TrueHD among others.

The PCH 426 may also include functionality for providing networking functionality through a Gigabit Ethernet Controller 460. The Gigabit Ethernet Controller 460 is capable of connecting the computer 400 to another computer via a network. Connections which may be made by the Gigabit Ethernet Controller 460 may include LAN or WAN connections. LAN and WAN networking environments are commonplace in offices, enterprise-wide computer networks, intranets, and the internet.

The PCH 426 may also provide a bus for interfacing peripheral card devices such as a graphics adapter 462. The graphics adapter 462 may be a device 112 as illustrated in FIG. 1 and FIG. 2. In one embodiment, the bus comprises a PCI bus. The PCI bus may include a Peripheral Component Interconnect ("PCI") bus, a Peripheral Component Interconnect eXtended ("PCI-X") bus and a Peripheral Component Interconnect Express ("PCIe") bus among others.

The PCH 426 may also provide a system management bus 464 for use in managing the various components of the computer 400. Additional details regarding the operation of the system management bus 464 and its connected components are provided below.

The PCH 426 is also configured to provide one or more interfaces for connecting mass storage devices to the computer 400. For instance, according to an embodiment, the PCH 426 includes a serial advanced technology attachment ("SATA") adapter for providing one or more serial ATA ports 436. The serial ATA ports 436 may be connected to one or more mass storage devices storing an operating system 114 and application programs, such as the SATA disk drive 438. Storage devices such as the SATA disk drive 438 may also be considered a device 112. As known to those skilled in the art, an operating system 114 comprises a set of programs that control operations of a computer and allocation of resources. An application program 442 is software that runs on top of the operating system software 114, or other runtime environment, and uses computer resources to perform application specific tasks desired by the user.

According to one embodiment of the invention, the operating system 114 comprises the LINUX operating system. According to another embodiment of the invention the operating system 114 comprises the WINDOWS SERVER operating system from MICROSOFT CORPORATION. According to another embodiment, the operating system 114 comprises the UNIX operating system. It should be appreciated that other operating systems may also be utilized.

The mass storage devices connected to the PCH 426, and their associated computer-readable storage media, provide non-volatile storage for the computer 400. Although the description of computer-readable storage media contained herein refers to a mass storage device, such as a hard disk or CD-ROM drive, it should be appreciated by those skilled in the art that computer-readable storage media can be any available media that can be accessed by the computer 400.

By way of example, and not limitation, computer-readable storage media may comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 400.

A low pin count ("LPC") interface may also be provided by the PCH 426 for connecting a Super I/O device 470. The Super I/O device 470 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") 448 for storing the firmware 102 that includes program code containing the basic routines that help to start up the computer 400 and to transfer information between elements within the computer 400. Some examples of firmware include Basic Input/Output System ("BIOS"), Unified Extensible Firmware Interface ("UEFI") and Open Firmware among others. As mentioned above regarding FIG. 1, the metadata 106 is stored in NVRAM 108. Alternatively, the metadata 106 could be stored in another type of flash memory. The metadata 106 may allow the firmware 102 to accelerate bus enumeration.

As described briefly above, the PCH 426 may include a system management bus 464. The system management bus 464 may include a Baseboard Management Controller ("BMC") 466. In general, the BMC 466 is a microcontroller that monitors operation of the computer 400. In a more specific embodiment, the BMC 466 monitors health-related aspects associated with the computer 400, such as, but not limited to, the temperature of one or more components of the computer 400, speed of rotational components (e.g., spindle motor, CPU Fan, etc.) within the computer 400, the voltage across or applied to one or more components within the computer 400, and the available or used capacity of memory devices within the computer 400. The BMC 466 performs these monitoring functions by being communicatively connected to one or more components by way of the system management bus 464.

In an embodiment, these components include sensor devices 468 for measuring various operating and performance-related parameters within the computer 400. The sensor devices 468 may be either hardware or software based components configured or programmed to measure or detect one or more of the various operating and performance-related parameters.

The BMC 466 functions as the master on the system management bus 464 in most circumstances, but may also function as either a master or a slave in other circumstances. Each of the various components communicatively connected to the BMC 466 by way of the system management bus 464 is addressed using a slave address. The system management bus 464 is used by the BMC 466 to request and/or receive various operating and performance-related parameters from one or more components, which are also communicatively connected to the system management bus 464.

It should be appreciated that the computer 400 may comprise other types of computing devices, including handheld computers, embedded computer systems, personal digital assistants, and other types of computing devices known to those skilled in the art. It is also contemplated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for bus enumeration acceleration are presented herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes may be made to the subject matter described herein without following the example embodiments and applications illustrated and described, and without departing from the true spirit and scope of the present invention.

What is claimed is:

1. A computer-implemented method for accelerating enumeration of devices on a bus in a computing system, the method comprising:
   determining whether the computing system is a closed system, wherein the computing system includes devices coupled to a motherboard, and wherein determining whether the computing system is a closed system is based in part on determining that at least one of the devices coupled to a motherboard are not fixed devices, wherein a fixed device is directly attached to the motherboard;
   responsive to determining that the computing system is a closed system, programming the devices on the bus in the computing system using previously stored metadata without performing bus enumeration for the devices;
   responsive to determining that the computing system is not a closed system, determining whether a change has occurred in a configuration of the devices on the bus in the computing system since a previous boot of the computing system, wherein determining whether a change has occurred in the configuration of the devices is based in part on, without performing bus enumeration, probing a manufacturer identifier and a device identifier of the devices and comparing the queried manufacturer identifiers and device identifiers to manufacturer identifiers and device identifiers stored in a bios of the computing system;
   responsive to determining that no change has occurred in the configuration of the devices since the previous boot of the computing system,
   programming the one or more devices associated with the bus using the previously stored metadata without performing bus enumeration for the one or more devices;
   responsive to determining that a change has occurred in the configuration of the devices since the previous boot of the computing system, enumerating the bus of the computing system to generate updated metadata, storing the updated metadata, and programming the one or more devices associated with the bus using the updated metadata.

2. A computer-readable storage medium, having computer-executable instructions stored thereupon which, when executed by a processor, cause the processor to:
   determine whether a computing system is a closed system, wherein the computing system includes devices coupled to a motherboard, and wherein determining whether the computing system is a closed system is based in part on determining that the devices coupled to a motherboard are fixed devices, wherein a fixed device is directly attached to the motherboard; and
   responsive to determining that the computing system is a closed system, program the devices on a bus of the computing system using a previously stored metadata without enumerating the devices on the bus of the computing system.

3. The computer-readable storage medium of claim 2, having further instructions stored thereupon which, when executed by the processor, cause the processor to:
   responsive to determining that the computer is not a closed system, determine whether a change has occurred in a configuration of the devices on the bus of the computing system; and
   responsive to determining that no change has occurred in the configuration of the devices,
   program the devices on the bus using the previously stored metadata without performing bus enumeration for the devices.

4. The computer-readable storage medium of claim 3, having further instructions stored thereupon which, when executed by the processor, cause the processor to:
   responsive to determining that a change has occurred in the configuration of the devices,
   perform bus enumeration for the devices to generate updated metadata,
   store the updated metadata, and program the devices on the bus using the updated metadata.

5. The computer-readable storage medium of claim 3, wherein determining whether a change has occurred in the configuration of the devices comprises probing one or more base address registers associated with the bus.

6. A computer comprising:
   a processor;
   a bus coupled to the processor and having one or more devices coupled thereto, wherein the bus comprises a hierarchy of buses; and
   a memory communicatively coupled to the processor having a firmware stored thereon that executes in the processor from the memory and which, when executed by the processor, causes the computer to
   determine whether one of the hierarchy of buses of the computer is a closed system, wherein devices are coupled to the one of the hierarchy of buses, and wherein determining whether the one of the hierarchy of buses is a closed system is based in part on determining that at least one of the devices are not fixed devices, wherein a fixed device is attached directly to the bus,
   responsive to determining that the one of the hierarchy of buses is a closed system, program the devices using previously stored metadata without enumerating the one of the hierarchy of buses, wherein the previously stored metadata was provisioned when the computer was fabricated, responsive to determining that the one of the hierarchy of buses is not a closed system, determine whether a configuration of at least one device of the devices on the one of the hierarchy of buses has changed since a previous boot of the computer, responsive to determining that the configuration of at least one device of the devices has not changed since a previous boot of the computer, program the devices using the previously stored metadata without enumerating the one of the hierarchy of buses, and responsive to determining that the configuration of a least one device of the devices has changed since a previous boot of the computer, enumerating the one of the hierarchy of buses to generate updated metadata, store the updated metadata, and program the devices using the updated metadata.

7. The computer of claim 6, wherein determining whether a configuration of at least one device of the devices on the one of the hierarchy of buses has changed comprises probing one or more base address registers associated with the one of the hierarchy of buses.

8. The computer-implemented method of claim 1, wherein the previously stored metadata describes interrupts utilized by the devices on the bus in the computing system.

9. The computer-implemented method of claim 1, wherein the previously stored metadata describes a parent/child hierarchy of the devices on the bus in the computing system.

10. The computer-implemented method of claim 1, wherein the previously stored metadata describes functions implemented by the devices on the bus in the computing system.

11. The computer-implemented method of claim 1, wherein the previously stored metadata comprises contents of one or more base address registers.

12. The computer-readable storage medium of claim 2, wherein the previously stored metadata is created during an initial boot of the computer.

13. The computer-readable storage medium of claim 3, wherein determining whether a change has occurred in a configuration of the devices on the bus of the computing system comprises probing the bus to verify a vendor ID and a device ID of the devices on the bus of the computing system.

14. The computer of claim 6, wherein determining whether a configuration of at least one device of the one or more devices on the bus has changed comprises probing the bus to verify a vendor ID and a device ID of the one or more devices.

15. The computer of claim 6, wherein the previously stored metadata is stored in the computer during fabrication of the computer.

\* \* \* \* \*